United States Patent [19]
McClellan et al.

[11] Patent Number: 5,928,583
[45] Date of Patent: Jul. 27, 1999

[54] PROCESS FOR MAKING CERAMIC BODIES HAVING A GRADED POROSITY

[75] Inventors: Kenneth J. McClellan; John J. Petrovic, both of Los Alamos; Ivar E. Reimanis, Golden, all of N.M.

[73] Assignee: The Reagents of the University of California, Los Alamos, N.M.

[21] Appl. No.: 08/865,413

[22] Filed: May 29, 1997

[51] Int. Cl.[6] .................................................. C04B 38/06
[52] U.S. Cl. .............................. 264/43; 264/44; 264/643; 264/654; 264/325
[58] Field of Search .............................. 264/43, 44, 325, 264/643, 654

[56] References Cited

U.S. PATENT DOCUMENTS

| | | |
|---|---|---|
| 3,531,248 | 9/1970 | Sheinberg . |
| 3,868,267 | 2/1975 | Gazza et al. . |
| 5,019,539 | 5/1991 | Claar et al. . |
| 5,098,870 | 3/1992 | Claar et al. . |
| 5,523,268 | 6/1996 | Ukyo ........................................ 501/92 |
| 5,525,374 | 6/1996 | Ritland et al. . |
| 5,707,567 | 1/1998 | Pfaff ........................................ 264/44 |

OTHER PUBLICATIONS

W. D. Kingery, *Introduction to Ceramics*, John Wiley & Sons, New York, 1976, p. 3.

D. W. Richerson, *Modern Ceramic Engineering*; Properties, and Use in Design, Marcel Dekker, Inc., New York, 1982, pp. 136, 217–259.

S. Prochazka in *Ceramics for High Performance Applications*, ed. by J.J. Burke et al., Brook Hill Publishing Co., 1974, pp. 239–252.

W. Braue et al. in "Microstructure and Densification of Sintered (B+C)–Doped β–Silicon Carbide," Materials Research Society Symposium Proceedings, 237, edited by A.R. Barron et al., Materials Research Society, Pittsburgh, PA, 1994, p. 271.

*Primary Examiner*—James Derrington
*Attorney, Agent, or Firm*—Samuel L. Borkowsky

[57] ABSTRACT

Process for making graded porosity ceramics. A process for making graded porosity ceramics is described which includes the steps of placing a chosen amount of ceramic powder into a mold, compacting the ceramic powder into a green body, applying at least one sintering aid precursor to at least one chosen surface of the green body, allowing the at least one sintering aid precursor to penetrate the at least one surface within a chosen volume of the green body, heating the green body, whereby the sintering precursor generates a sintering aid, and hot pressing and sintering the heated body at a temperature whereby the green body is transformed into the sintered ceramic object.

12 Claims, 1 Drawing Sheet

PROCESS FOR MAKING CERAMIC BODIES HAVING A GRADED POROSITY

FIELD OF THE INVENTION

The present invention relates generally to processes for making ceramic bodies and, more particularly, to a process for making ceramic bodies having a graded porosity within the ceramic. This invention was made with government support under Contract No. W-7405-ENG-36 awarded by the U.S. Department of Energy to the Regents of the University of California. The government has certain rights in the invention.

BACKGROUND OF THE INVENTION

The ceramics industry provides materials having properties that are critical for many applications. In W. D. Kingery et al. in *Introduction to Ceramics*, John Wiley & Sons, New York, 1976, page 3, "ceramics" is defined as the art and science of making and using solid articles which have as their essential component, and are composed in large part of, inorganic materials such as pottery, porcelain, refractories, structural clay products, abrasives, porcelain enamels, cements, glass, nonmetallic magnetic materials, ferroelectrics, manufactured single crystals, and a variety of other products.

In contrast to metal objects which are tough (where "toughness" is defined in D. W. Richerson, *Modern Ceramic Engineering, Properties, Processing, and Use in Design*, Marcel Dekker, Inc., New York, 1982, page 136, as having high capability to survive impact, the application of a structural load at a very high loading rate usually to a localized area) and which yield and deform, ceramic objects are hard and brittle and much less tough, fracture with little or no deformation, and require fabrication techniques which differ considerably from those for making metal objects. One technique for fabricating ceramic objects that is widely used in the glass-making industry involves melting the ceramic and shaping it as it cools and solidifies. A second general technique used to make ceramic objects involves compacting a finely-ground ceramic powder into the ceramic body. Prior to compaction and heating, a binder may optionally be added to the powder. This results in a plasticized compact that may be handled and machined more easily.

Much research in the ceramic industry targets the improvement of the physical properties of ceramic materials for use in applications where both material hardness and toughness are required. These efforts have led to the development of composite materials known as cermets. Cermets are made from ceramic materials and metals, and consist of a porous ceramic matrix having metal occupying the pores of the matrix. Cermets retain the hardness properties of the ceramic from which they are composed, and are also able to withstand greater impact stresses due to the metal network within the cermet.

Various techniques for fabricating cermets are known in the art. In U.S. Pat. No. 5,019,539 by Clarr et al. entitled "Process for Preparing Self-Supporting Bodies Having Controlled Porosity and Graded Properties and Products Thereby," issued May 28, 1991, a method for making cermets where a ceramic powder and a metal powder are combined and pressed into a compact which is then heated above the melting point of the metal is described. In example 1 of the '539 patent, column 9, lines 22–58 a is detailed procedure for the formation of a cermet of boron carbide ($B_4C$) and zirconium (Zr) is illustrated. Powders of $B_4C$ and of Zr are combined, shaken, placed in a graphite crucible, and pressed with a die to make a pre-form. The die/pre-form assembly is heated under argon in a furnace, and the final product is a $B_4C$/Zr composite body having porosity as shown in FIGS. 1–4 of Clarr et al. In the '539 patent, a second method for making cermets is also described, where an initial ceramic/metal compact formed by first combining powdered metal and powdered ceramic and pressing, is then contacted with molten metal which infiltrates the compact to form a cermet. Both methods described in the '539 patent include the initial mixing of ceramic powder and metal powder to form cermets.

Alternatively, ceramic powder may first be compacted, sintered into a hard, porous ceramic matrix, and finally infiltrated by molten metal to form a cermet. The sintering process involves heating the compact in order to promote strong bonds between the individual ceramic particles while densifying through the removal of pores within the body. It is the sintering process which transforms the fragile and easily disfigured ceramic body resulting from initial compaction of ceramic powder into a strong, useful ceramic component.

In *Modern Ceramic Engineering Properties, Processing and Use in Design* by D. W. Richerson, Marcel Dekker Inc., 1982, the sintering (i.e. densification) techniques used in fabricating ceramic matrices are reviewed (see chapter 7, pages 217–259). Not all ceramic materials may successfully be densified by sintering. The sintering process may be successful if mass transport within the compact can by induced by heating the compact. The starting ceramic compact, known in the art as the "green body," is formed by pressing a ceramic powder into a shape, or by adding a plasticizing binder to the powder and then pressing. Additionally, an additive known in the art as a "sintering aid" or "densification aid" may be also be added to the ceramic powder prior to pressing. The sintering aid may be added in the form of a sintering aid precursor which is transformed into the true sintering aid. The sintering aid or sintering aid precursor may also enhance the structural integrity of the green body as a binder would. However, a binder is added solely to produce a more machinable green body and then removed prior to sintering the green body by heating the green body above the boiling temperature of the binder, but below the sintering temperature of the ceramic. By contrast, a sintering aid facilitates the densification of the green body into the final hard ceramic object during sintering, and remains within final hard ceramic body after sintering.

In Richerson, page 243, a table which includes a list of ceramic materials and their appropriate sintering aids is displayed. The following pairs taken from the table illustrate several known combinations of ceramic/sintering aids, respectively: alumina ($Al_2O_3$) with lithium fluoride (LiF), magnesium oxide (MgO) with LiF or sodium fluoride (NaF), beryllium oxide (BeO) with lithium oxide ($Li_2O$), silicon nitride ($Si_3N_4$) with magnesium oxide (MgO) or yttrium oxide ($Y_2O_5$) or beryllium silicon nitride ($BeSiN_2$), silicon carbide (SiC) with boron (B) or alumina or aluminum (Al). Several of the above combinations ceramic materials, such as MgO or $Si_3N_4$, may be sintered with different sintering aids. The choice of sintering aid for a particular ceramic is determined experimentally. Thus, one particular material which acts as a sintering aid for a particular ceramic material may or may not act as a sintering aid for a different ceramic material.

The addition of sintering aids may allow sintering of a ceramic which would otherwise sinter only under extremely high pressures, or perhaps not all. For example, SIC, $Si_3N_4$, $B_4C$ sinter only under extremely high pressures, if at all. In *Ceramics for High Performance Applications* by S. Prochazka, edited by J. J. Burke et al., Brook Hill Publishing Co., 1974, pages 239–252, it is disclosed that the densification of powdered SiC is extremely difficult in the absence of a sintering aid, and diamond-forming conditions are needed to form objects having near theoretical density. However, with the addition of 1% boron as a sintering aid, SiC may be sintered at pressures as low as 100 PSI.

Sintering aids may be added directly to the ceramic powder, or may be formed from sintering aid precursors which are added to the ceramic and which transform into sintering aids upon heating. For example, in "Microstructure and Densification of Sintered (B+C)-Doped β-Silicon Carbide" by W. Braue et al., Materials Research Society Symposium Proceedings, 237, edited by A. R. Barron et al., Materials Research Society, Pittsburgh, Pa., 1994, page 271, the addition of a phenolic resin to SiC and heating of the resin/SiC mixture is described. The phenolic resin is a sintering aid precursor, and heating of the SiC/resin above the sintering temperature decomposes the resin into carbon which acts as the true sintering aid.

It has been shown that hard, porous ceramic bodies are made by sintering a ceramic powder compact, and that infiltration of the sintered compact by metals yields cermets having the hardness of a ceramic and enhanced toughness due to the internal metal network. It may be advantageous to control the porosity of either the ceramic green body prior to sintering, or the hard compact which results from sintering the green body. The controlled porosity desired may be, in particular, a graded porosity where the porosity gradually increases from one part of the ceramic body to another. Infiltration of metal within such a graded-porosity ceramic body yields a cermet which may have graded physical properties resulting from the internally graded structure of the cermet.

The advantages of graded-porosity cermets and procedures for making them have been described in the art. One general procedure for forming graded-porosity cermets involves initial mixing of ceramic and metal powder followed by pressing and sintering to form the graded-porosity cermet. Another general procedure involves infiltration of a metal into a graded-porosity ceramic matrix. Several procedures for making ceramic matrices having a controlled porosity and, in particular, a graded porosity, are described below.

In U.S. Pat. No. 3,868,267 by G. E. Gazza et al. entitled "Method of Making Gradient Ceramic-Metal Material," which issued on Feb. 25, 1975, a method for making cermets having graded properties, whereby a graded-porosity boron-containing ceramic compact such as compacted boron carbide ($B_4C$) is infiltrated by silicon and aluminum is disclosed. In the '267 patent, the graded-porosity ceramic is made by first placing ceramic powder into a mold and vibrationally redistributing the powder particles by their appropriate particle sizes within the mold, then cold pressing the powder to form a porous ceramic compact, and finally infiltrating each separate volume of the compact with molten material. Further, details of the procedure for the fabrication of a porous ceramic body are found in column 2, lines 12–24, and include first separating ceramic powder into 2 particle size fractions, placing the first fraction having smaller particle size into a cold press die and tapping the die, placing the fraction having the larger particle size in the die above the first fraction, tapping the die again, and cold-pressing the fractions together to form a porous compact. This compact is then infiltrated with other substances such as silicon and aluminum to form a graded material. Although the '267 patent teaches the formation of a graded-porosity ceramic compact, there is no teaching of the use of a sintering aid precursor or a sintering aid.

In U.S. Pat. No. 5,525,374 by M. A. Ritland et al. entitled "Method for making Ceramic-Metal Gradient Composites," which issued on Jun. 11, 1996, a process for producing graded porosity ceramic bodies which are then infiltrated to produce cermets is described (see column 9, lines 25–46). First, a free-standing, sintered ceramic body having a porosity gradient is fabricated. Then, the ceramic body is infiltrated with metal to produce a cermet having graded properties. The '374 patent describes various methods for controlling the porosity in the green body, which are summarized herein. In one method, the ceramic powder may be subjected to vapor-phase sintering to form a porous green body having a controlled porosity. In a second method, the porosity of a green body may be controlled by forming agglomerates of the ceramic powder. For example, as described in column 6, lines 18–29, calcination of 50 micron size aluminum hydroxide ($Al(OH)_3$) particles produces alumina ($Al_2O_3$) agglomerates which may be subsequently used to form a green body having a chosen porosity. A third method involves varying the pressure during compact formation to aid in controlling the total porosity of the green body. In a fourth method, the green body may be pre-sintered at a temperature slightly below the sintering temperature of the ceramic to control the final porosity of the final sintered body. Another method which may control the pore size and pore distribution includes varying the total sintering time.

In the '374 patent, column 8, lines 49–53, it is stated that sintering the ceramic without the addition of a sintering aid may produce a sintered ceramic body having open porosity. In the '374 patent, column 9 lines 32–34, it is also stated that a ceramic body having a homogeneous particle distribution can be sintered in a temperature gradient to produce a ceramic body having varying levels of porosity. Although the '374 patent describes the use of a sintering aid or sintering aid precursor to densify the ceramic body during sintering, the sintering aid is mixed directly with the ceramic powder prior to sintering. The '374 patent does not teach the addition of a sintering aid or sintering aid precursor to ceramic powder or a green body where a specific mode of addition is responsible for producing the graded porosity in the ceramic body.

In U.S. Pat. No. 5,098,870 by Clarr et al. entitled "Process for Preparing Self-Supporting Bodies Having Controlled Porosity and Graded Properties and Products Produced Thereby," which issued on Mar. 24, 1992, a method for producing self-supporting bodies comprising borides or boride/carbide mixtures having controlled porosity and graded properties is described. In the '870 patent, column 6, lines 54–61, it is stated that the pore sizes within the compacts are due to the metal within the compact, and that larger metal particles within the compact are equivalent to larger pore sizes. In the '870 patent, column 6, line 67 through column 7, line 8, a process for making a $B_4C$/metal body having a relatively dense first surface and relatively porous second surface opposing the first surface is described. This process involves mixing relatively large metal particles with $B_4C$ powder near the surface of the body chosen to be the porous side, and mixing relatively small metal particles with the $B_4C$ powder near the surface chosen to be the more dense side.

In the '870 patent, column 7, lines 31–50, a method for making a cermet by combining ceramic powder with molten metal is described. The metal in the cermet is equivalent to the porosity within the cermet, where a higher concentration of metal translates into a higher porosity. The porosity produced when a body or pool of metal is used in lieu of powdered metal may not be as controlled or uniform as the porosity produced when powdered metal is used.

In the '870 patent, column 7, lines 51–66, a process for forming a porous $B_4C$ body is also described, wherein $B_4C$ powder is combined with various combustible additives such as gelatin, corn starch, and wax, which permit the formation of an initially dense pre-form and aid in the porosity-forming process. These additives leave pores when they are removed prior to sintering the green body and allow further control of porosity within the final, hard porous ceramic object.

Prior teachings have shown that cermets are an important class of materials which can be made by either direct mixing of metal and ceramic powder, or by infiltration of a metal into a porous ceramic body. Methods which allow easy access to preformed graded-porosity ceramic bodies are desirable because these bodies may be infiltrated to form cermets having graded properties. Known methods involve the arrangement of particle sizes to achieve the desired gradient.

Therefore, an object of this invention is to provide a process for making ceramic bodies having a graded porosity from a ceramic powder having a monomodal particle-size distribution.

Another object of this invention is to provide a process for making cermets having a graded properties.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the process for making ceramic bodies having a graded porosity of the present invention includes the steps of placing a chosen amount of ceramic powder into a die, cold-pressing the powder into a compact, applying a coat of liquid sintering agent precursor to a surface of the compact, allowing the sintering agent precursor to penetrate a chosen volume of the compact, hot pressing the compact. The resulting sintered compact having a graded porosity may be infiltrated using known infiltration procedures to produce a cermet having graded properties.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1 is a reflected light optical micrograph of a cross section of the body. The upper portion of the section of the body shows the surface to which a sintering aid precursor was applied.

FIG. 2 is a reflected light optical micrograph of a cross section of the middle of the sintered ceramic body.

FIG. 3 is a reflected light optical micrograph of a cross section of the sintered ceramic body. The lower portion of the body shows the surface opposing the one to which the sintering aid precursor was applied.

DETAILED DESCRIPTION OF THE INVENTION

Figure 1:
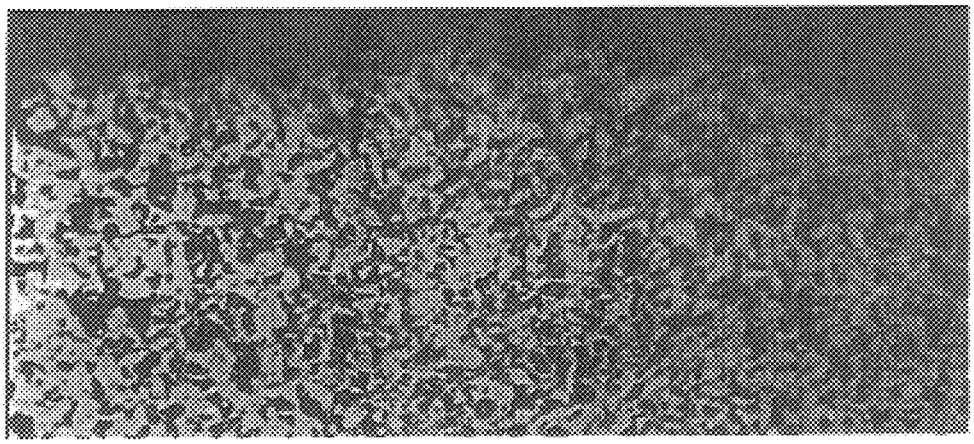
FIGS. 1, 2, and 3 are reflected light optical micrographs of cross sections of a sintered ceramic body having a graded porosity made by the present process invention. The micrographs contain light and dark sections. The light sections represent ceramic volume and the dark sections represent empty volume.

Briefly, the present invention includes a process for making ceramic bodies having a graded porosity. The process involves applying a liquid sintering aid precursor to the surface of a preformed ceramic powder compact and sintering the compact. A graded-porosity body is produced when the starting material is a ceramic powder having a monomodal distribution of particle sizes. During the process, the powder is not vibrated or agitated prior to cold pressing. Therefore, the graded nature of the resulting ceramic body is not derived from an initial redistribution of various particle sizes, but rather results from a distribution of sintering aid precursor within the pre-sintered ceramic green body. The sintered ceramic body which results from the application of liquid sintering aid precursor to a face of the ceramic compact has a graded porosity, where the porosity increases in the direction away from the side to which the sintering aid precursor was applied.

The example which follows employs boron carbide ($B_4C$) as the ceramic powder, and a solution of maleic anhydride in furfuryl alcohol as the sintering aid precursor. The $B_4C$ powder is first cold pressed into a compact puck. The furfuryl alcohol/maleic anhydride solution is applied to one surface of the puck and allowed to penetrate the puck surface. The puck is then heated to a temperature below the sintering temperature in order to transform the sintering aid precursor into the sintering aid, carbon. See, e.g., U.S. Pat. No. 3,531,248 by Haskell Sheinberg which issued on Sep. 29, 1970, column 1, lines 39–43, where it is stated that the thermal treatment of the combination of furfuryl alcohol and maleic anhydride results in the production of amorphous carbon. The amount of sintering aid precursor is greatest on the side of the puck to which it is applied, and decreases gradually as it penetrates the puck. The inventors believe that carbon is also greatest on the surface to which the sintering aid precursor solution was applied, and gradually decreases away from this surface throughout the volume of the puck. The sintered puck retains the original shape of the green body puck but is harder and denser than the green body puck, and has a graded porosity which increases in the direction away from the side of the puck which was coated with the sintering aid precursor.

Having generally described the invention, the following example more particularly describes the fabrication of a $B_4C$ ceramic puck having a graded porosity.

EXAMPLE

An 8.2408 g sample of $B_4C$ powder having a monomodal particle distribution between 1–11 $\mu$m, a mean size 4.5 $\mu$m, and a median size 4.9 $\mu$m with a standard deviation 2.3 $\mu$m, was uniaxially cold pressed in a 1.24" I.D. graphite die at 1050 psi into a puck. The puck was removed from the press, and one milliliter of a solution of 4 grams maleic anhydride in 100 ml furfuryl was applied evenly to one face of the puck. After the solution was allowed to penetrate the puck for 10 hours, the puck was heated to 250° C. over 8 hours. The puck was cooled and placed back into the original die and the assembly was placed into a vacuum hot press. There, the puck was placed under a $10^{-6}$ torr vacuum and heated to 850° C. for 1.5 hour. The temperature was held at 850° C. for an additional hour, and then increased to 2000° C. over 1.5 hours. The puck was then pressed to 3000 psi while holding the temperature at 2000° C. for an additional 0.5 hour, after which the puck and die assembly was cooled to room temperature. The puck was removed from the die, weighed, and measured. The sintered puck weighed 8.1379 grams and had dimensions of 1.24" diameter by 0.19" thickness. Some loss in mass was attributed to mechanical loss of ceramic material prior to sintering.

Figure 2:
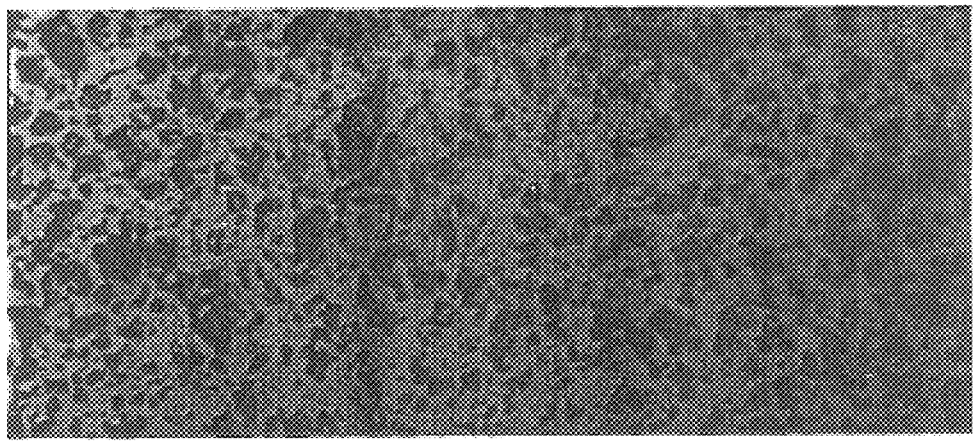
Figure 3:
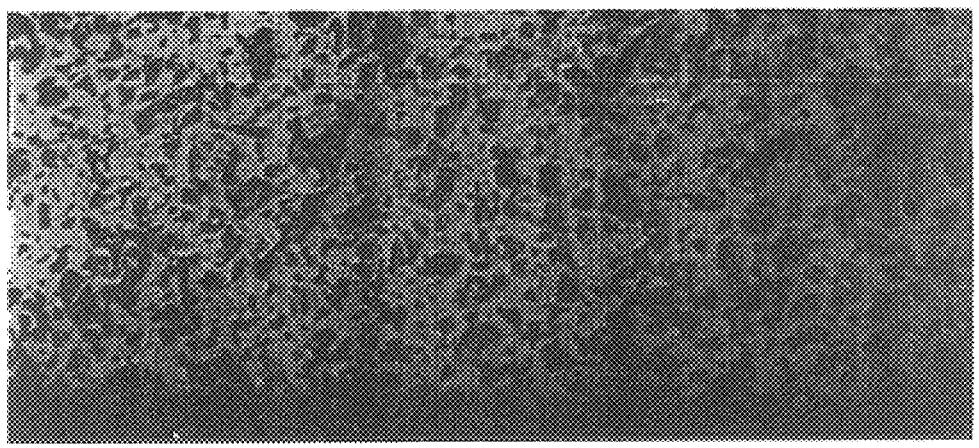

Reflected light optical micrographs of the top, middle and bottom centerline sections of the sintered puck are shown in FIGS. 1, 2, and 3, respectively. The density of each portion was calculated from the figures. The section in FIG. 1 contains the face to which the sintering aid precursor alcohol solution was applied. This section has about 25% porosity. The middle section in FIG. 2, which is adjacent to the section in FIG. 1, has about 29% porosity. The third section shown in FIG. 3, which is adjacent to the middle section shown in FIG. 2, has about 37% porosity, or conversely, about 63% of theoretical density. Thus, the porosity of the sintered puck increases in the direction away from the face treated with the sintering aid precursor.

The foregoing description of the invention has been presented for purposes of illustration and description and is not intended to be exhaustive or to limit the invention to the precise form disclosed, and obviously many modifications and variations are possible in light of the above teaching. For example, the sintered ceramic puck having graded porosity as described in the example can be infiltrated with a material such as a metal or a polymer using known methods of infiltration to produce a cermet having graded properties.

The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A process for making a sintered ceramic body, comprising the steps of:
   a. compacting a chosen amount of ceramic powder comprising $B_4C$, thereby forming a green body;
   b. applying at least one sintering aid precursor to at least one surface of the green body;
   c. allowing the at least one sintering aid precursor to penetrate the at least one surface within a chosen volume of the green body;
   d. heating the green body having the penetrated sintering aid precursor therein, whereby the sintering aid precursor is at least partially transformed into a sintering aid and the green body is transformed into a pre-sintered body; and
   e. hot pressing the pre-sintered body, thereby transforming the pre-sintered body into the sintered ceramic body.

2. The process for making the sintered ceramic body as described in claim 1, wherein the ceramic powder has a monomodal particle size distribution.

3. The process for making the sintered ceramic body as described in claim 2, wherein the sintered ceramic body has a controlled porosity.

4. The process for making the sintered ceramic body as described in claim 3, wherein the controlled porosity is a graded porosity.

5. The process for making the sintered ceramic body as described in claim 1, wherein the at least one sintering aid precursor is a liquid.

6. The process for making the sintered ceramic body as described in claim 5, wherein the at least one sintering aid precursor is a solution of maleic anhydride and furfuryl alcohol.

7. A process for making a sintered ceramic body, comprising the steps of:
   a. compacting a chosen amount of ceramic powder comprising $B_4C$ into a green body,
   b. applying at least one sintering aid precursor to at most one surface of the green body,
   c. allowing the at least one sintering aid precursor to penetrate the at most one surface within a chosen volume of the green body,
   d. heating the green body having the penetrated sintering aid precursor therein, whereby the sintering aid precursor is at least partially transformed into a sintering aid and the green body is transformed into a pre-sintered body; and
   e. hot pressing the pre-sintered body, thereby transforming the pre-sintered body into the sintered ceramic body.

8. The process for making the sintered ceramic body as described in claim 7, wherein the ceramic powder has a monomodal particle size distribution.

9. The process for making the sintered ceramic body as described in claim 8, wherein the sintered ceramic body has a controlled porosity.

10. The process for making the sintered ceramic body as described in claim 9, wherein the controlled porosity is a graded porosity.

11. The process for making the sintered ceramic body as described in claim 7, wherein the at least one sintering aid precursor is a liquid.

12. The process for making the sintered ceramic body as described in claim 11, wherein the at least one sintering aid precursor is a solution of maleic anhydride and furfuryl alcohol.

* * * * *